United States Patent
Matsuoka et al.

(10) Patent No.: US 12,162,062 B2
(45) Date of Patent: Dec. 10, 2024

(54) MOLD STRENGTH MEASURING DEVICE, MOLDING SYSTEM, AND MOLD STRENGTH MEASURING METHOD

(71) Applicant: SINTOKOGIO, LTD., Nagoya (JP)

(72) Inventors: Hiroki Matsuoka, Nagoya (JP); Takato Ishii, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 46 days.

(21) Appl. No.: 17/902,163

(22) Filed: Sep. 2, 2022

(65) Prior Publication Data
US 2023/0074638 A1 Mar. 9, 2023

(30) Foreign Application Priority Data
Sep. 7, 2021 (JP) ................. 2021-145222

(51) Int. Cl.
*B22C 19/04* (2006.01)
*B22C 9/02* (2006.01)
*G01N 3/08* (2006.01)
*G01N 3/40* (2006.01)

(52) U.S. Cl.
CPC .............. *B22C 9/02* (2013.01); *B22C 19/04* (2013.01); *G01N 3/08* (2013.01); *G01N 3/40* (2013.01)

(58) Field of Classification Search
CPC ........... B22C 19/00; B22C 19/04; B22C 9/02; G01N 3/40
See application file for complete search history.

(56) References Cited

U.S. PATENT DOCUMENTS

| | | | | |
|---|---|---|---|---|
| 5,887,638 A | * | 3/1999 | Yoritsune | B22C 9/02 73/78 |
| 2008/0240511 A1 | * | 10/2008 | Ban | G06T 1/0007 901/30 |

FOREIGN PATENT DOCUMENTS

| | | | | |
|---|---|---|---|---|
| EP | 3736064 A1 | * 11/2020 | | B22C 19/04 |
| JP | H08-43286 A | 2/1996 | | |
| JP | H10-296391 A | 11/1998 | | |
| JP | 2012115849 A | * 6/2012 | | B22C 23/00 |
| WO | WO-2011067352 A2 | * 6/2011 | | B22F 3/1055 |
| WO | WO-2019064726 A1 | * 4/2019 | | B22C 21/12 |

* cited by examiner

*Primary Examiner* — Kevin E Yoon
(74) *Attorney, Agent, or Firm* — Faegre Drinker Biddle & Reath LLP

(57) ABSTRACT

A mold strength measuring device according to an aspect obtains information about strength of a mold having a product surface and a back surface opposite to the product surface. The mold strength measuring device comprising a cutting tool and a measurement probe. The cutting tool form a bottomed hole extending from the back surface toward the product surface in the mold. The measurement probe to be inserted into the hole to measure a reaction force received from a bottom of the hole.

4 Claims, 14 Drawing Sheets

Fig.2
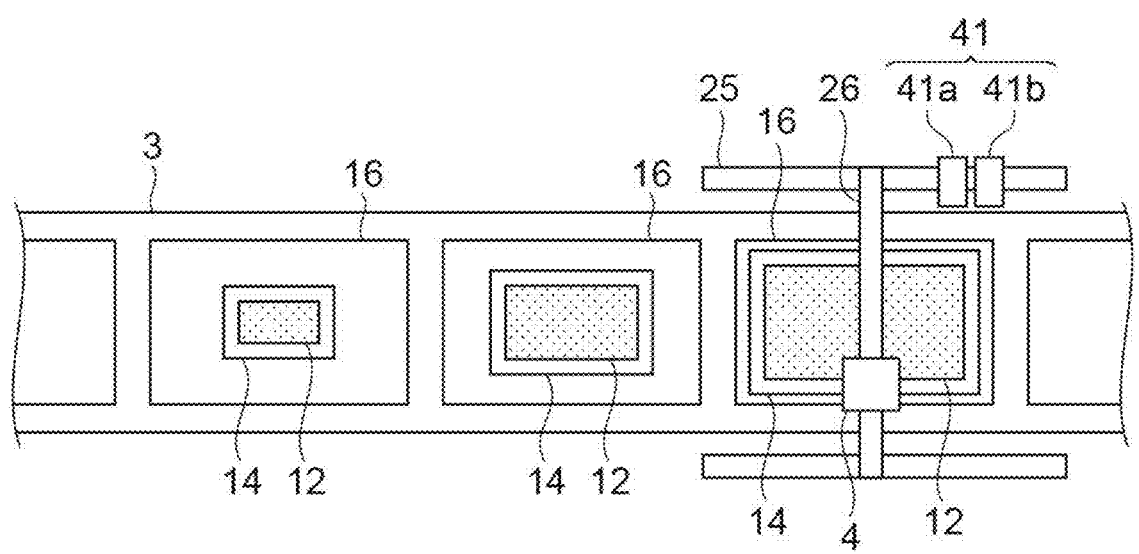
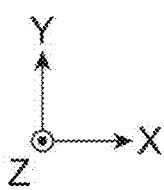

MOLD STRENGTH MEASURING DEVICE, MOLDING SYSTEM, AND MOLD STRENGTH MEASURING METHOD

CROSS-REFERENCE TO RELATED APPLICATIONS

This application is based on and claims the benefit of priority from Japanese Patent Application No. 2021-145222 filed on Sep. 7, 2021, the entire contents of which are incorporated herein by reference.

TECHNICAL FIELD

The present disclosure relates to a mold strength measuring device, a molding system, and a mold strength measuring.

BACKGROUND

Devices for measuring strength of a mold are known. For example, Japanese Patent Application Laid-Open Publication No. 08-43286 describes that strength of a mold is measured by pressing a measuring needle having a ceramic piece fixed to the tip thereof against a surface of the mold to measure a reaction force received from the mold with a load cell connected to the measuring needle when the measuring needle is inserted into the surface of the mold.

In addition, Japanese Patent Application Laid-Open Publication No. 10-296391 describes an apparatus that includes a pressing member connected to a load cell and moving means to move the pressing member in three axial directions of front and rear, left and right, and up and down, to measure strength of a cavity surface of a mold that has been drawn.

SUMMARY

In the apparatus described in Japanese Patent Application Laid-Open Publication No. 08-43286, since the measuring needle is inserted into the surface of the mold, it is possible to measure the strength on the surface of the mold, but it is difficult to measure the strength inside the mold. If the mold is drawn from a pattern in a state where the inside of the mold is not sufficiently hardened, the mold may collapse or be distorted.

Therefore, technique to obtain information about strength of the inside of the mold before the mold is drawn is required.

A mold strength measuring device according to an aspect obtains information about strength of a mold having a product surface and a back surface opposite to the product surface. The mold strength measuring device comprising a cutting tool and a measurement probe. The cutting tool form a bottomed hole extending from the back surface toward the product surface in the mold. The measurement probe inserted into the hole to measure a reaction force received from a bottom of the hole.

The mold strength measuring device according to the aspect forms the hole in the mold by the cutting tool and measures the reaction force received from the bottom of the hole. The reaction force received from the bottom of the hole is a measurement value of the strength inside the mold. Therefore, according to the mold strength measuring device of the aspect, it is possible to obtain information regarding the strength inside the mold before the mold is drawn.

The mold strength measuring device according to one embodiment may further include a lifting device to move the cutting tool and the measurement probe in a vertical direction to be close to and away from the mold. By vertically moving the cutting tool and the measurement probe to be close to and away from the mold, it is possible to form a hole in the mold and insert the measurement probe into the formed hole.

The mold strength measuring device according to one embodiment may further include a moving unit to integrally move the cutting tool and the measurement probe in a direction perpendicular to a conveying direction of the mold and the vertical direction. By integrally moving the cutting tool and the measurement probe, positioning of the measurement probe can be facilitated.

The mold strength measuring device according to one embodiment may further include a distance sensor to measure a distance to the mold, wherein the lifting device moves the distance sensor together with the cutting tool and the measurement probe in the vertical direction with respect to the mold. In this embodiment, the distance between the distance sensor and the mold in the vertical direction can be measured.

The mold strength measuring device according to one embodiment may further include a rotating shaft extending in a horizontal direction, wherein the cutting tool and the measurement probe extend in a direction perpendicular to an axial direction of the rotating shaft to form a predetermined angle in a circumferential direction around the rotating shaft, and are connected to each other to integrally rotate around the rotating shaft due to rotation of the rotating shaft. According to this embodiment, by integrally rotating the cutting tool and the measurement probe around the rotating shaft, one of the cutting tool and the measurement probe can be selectively directed toward the mold. As a result, it is possible to form the hole in the mold using the cutting tool and to measure the reaction force using the measurement probe in a short time.

In one embodiment, the measurement probe may include a sensor unit to measure a magnitude of the reaction force, a base connected to the sensor unit, and a tip portion provided at a distal end of the base, and a diameter of the tip portion may be smaller than a diameter of the base. By reducing the diameter of the tip portion, it is possible to suppress damage occurring in the mold when the measurement probe is pressed against the bottom of the hole and inserted into the bottom of the hole while ensuring the strength of the measurement probe.

The mold strength measuring device according to one embodiment may further include a foreign matter removal device to remove foreign matter attached to the measurement probe. By removing the foreign matter attached to the measurement probe, it is possible to suppress a measurement error caused by the foreign matter. In one embodiment, the mold may be a self-hardening mold, a thermosetting mold, or a gas-hardening mold.

A molding system according to one aspect includes a conveying line to convey a mold formed on a pattern, the mold having a product surface in contact with the pattern and a back surface opposite to the product surface, a mold strength measuring device to obtain information about strength of the mold, a drawing device to remove the mold from the pattern, and a line control unit to control the conveying line, wherein the mold strength measuring device includes a cutting tool to form a bottomed hole extending from the back surface toward the product surface in the mold, and a measurement probe to be inserted into the hole to measure a reaction force received from a bottom of the hole, wherein the line control unit is configured to control the conveying line to convey the mold to the drawing device when the reaction force measured by the measurement probe or compressive strength of the mold determined based on the reaction force is equal to or greater than a predetermined threshold value, and to cause the mold to wait on the conveying line when the reaction force or the compressive strength is less than the predetermined threshold value.

In the molding system according to this aspect, the mold is conveyed to the drawing device when the reaction force or the compressive strength of the mold measured before the mold is drawn is equal to or greater than the predetermined threshold value, and the mold is made to wait on the conveying line when the reaction force or the compressive strength of the mold is less than the predetermined threshold value. Therefore, the mold is prevented from being drawn when the strength of the mold is insufficient. As a result, it is possible to suppress occurrence of collapse or distortion of the mold when the mold is drawn.

In one embodiment, the line control unit may control an addition amount of a hardening agent included in the mold based on the reaction force or the compressive strength. By controlling the addition amount of the hardening agent, it is possible to adjust the hardening rate of the mold so that the mold has a predetermined strength when the mold is drawn.

In one embodiment, the line control unit controls an addition amount of a binder included in the mold based on the reaction force or the compressive strength. By controlling the addition amount of the binder, the strength of the hardened mold can be adjusted.

In a mold strength measuring method according to one aspect, information about strength of a mold having a product surface and a back surface opposite to the product surface is obtained. The method includes forming a bottomed hole extending from the back surface toward the product surface in the mold, and measuring a reaction force received by the measurement probe from a bottom of the hole.

As described above, according to the mold strength measuring method of this aspect, it is possible to obtain information about the strength inside the mold before the mold is drawn.

The method may further include obtaining compressive strength of the bottom based on the reaction force measured by the measurement probe.

In one embodiment, a depth of the hole may be more than half of a distance between the back surface and the product surface. By setting the depth of the hole to more than half of the distance between the back surface and the product surface, it is possible to measure the strength of a portion close to the product surface of the mold, which affects the performance of the mold. It should be noted that in one embodiment, the mold may be a self-hardening mold, a thermosetting mold, or a gas-hardening mold.

According to various aspects of the present disclosure, information about the strength inside the mold may be obtained prior to drawing of the mold.

BRIEF DESCRIPTION OF THE DRAWINGS

FIG. 2 is a top view schematically illustrating the strength measuring device.

DETAILED DESCRIPTION

Figure 1:
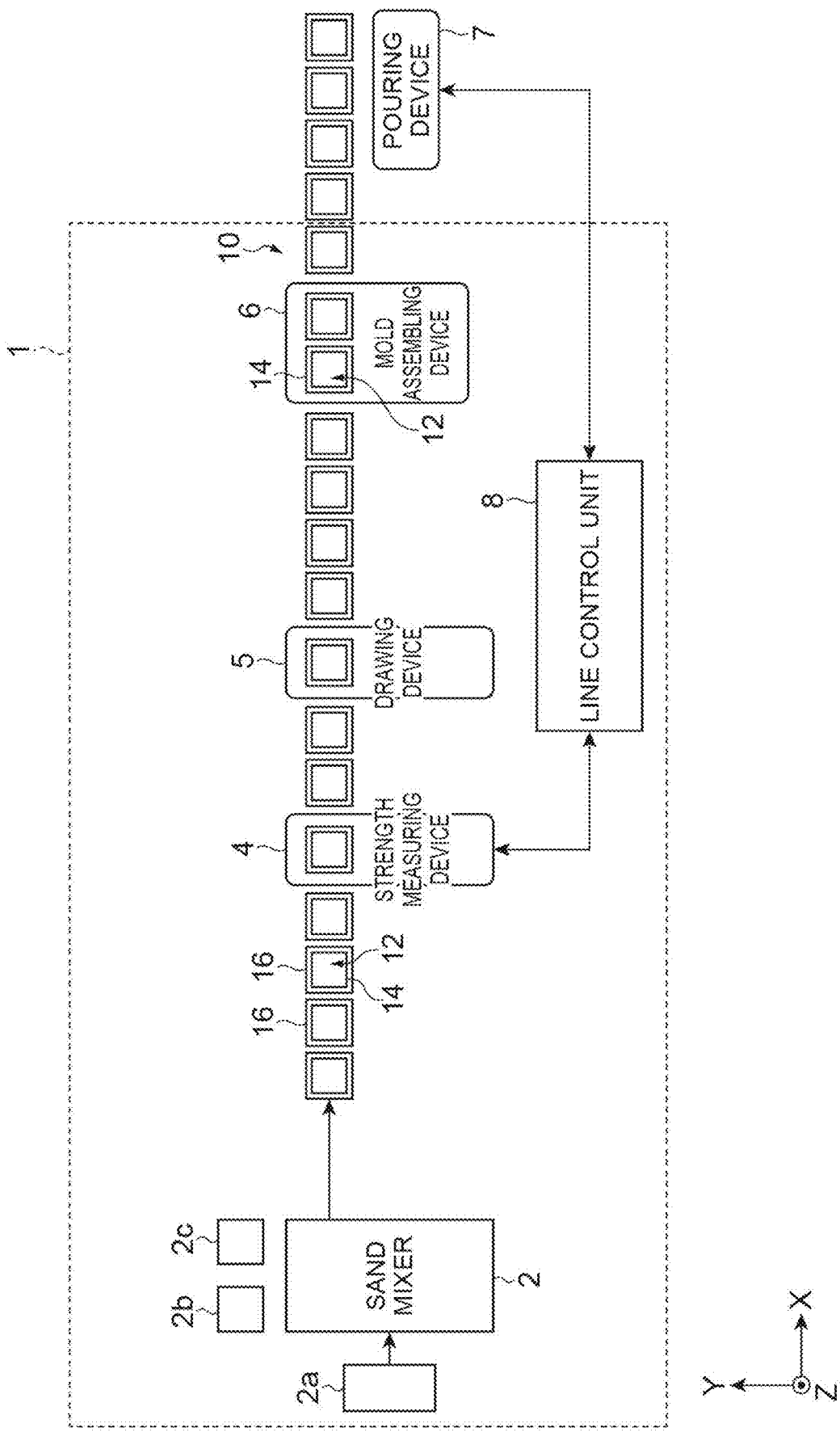
FIG. 1 is a diagram schematically illustrating a molding system including a strength measuring device according to one embodiment.

Hereinafter, embodiments of the present disclosure will be described with reference to the drawings. In the following description, the same or corresponding elements are denoted by the same reference numerals, and redundant description will not be repeated. The dimensional ratios in the drawings are not necessarily consistent with those in the description. The terms "up", "down", "left" and "right" are based on the illustrated state and are for convenience.

In the following description, a conveying direction of the mold is referred to as an X direction, a horizontal direction perpendicular to the X direction is referred to as a Y direction, and a direction perpendicular to the X direction and the Y direction is referred to as a Z direction. The X direction and the Y direction are horizontal directions, and the Z direction is a vertical direction. The terms "upstream" and "downstream" are used with reference to the conveying direction of the mold.

FIG. 1 is a diagram schematically illustrating a molding system including a strength measuring device according to an embodiment. A molding system 1 shown in FIG. 1 forms a mold 12 used for manufacturing a casting. As shown in FIG. 1, the molding system 1 includes a sand mixer 2, a strength measuring device (mold strength measuring device) 4, a drawing device 5, a mold assembling device 6, a line control unit 8, and a conveying line 10.

The sand mixer 2 produces mixed sand, which is the material of the mold 12. In one embodiment, the mixed sand includes molding sand, a binder, and a hardening agent. The molding sand, binder and hardening agent are supplied to the sand mixer 2 from a sand supply device 2a, binder supply device 2b and hardening agent supply device 2c, respectively. The binder is an inorganic binder or an organic binder. As the inorganic binder, for example, water glass or cement is used. As the organic binder, for example, a furan resin, a urethane resin, or a phenol resin is used.

As the hardening agent, a hardening agent corresponding to the type of the binder is used. For example, when a furan resin is used as the binder, an organic acid is used as the hardening agent. When a phenol resin is used as the binder, an organic ester, polyisocyanate, or the like is used as the hardening agent. In one embodiment, a plurality of hardening agents having different hardening rates may be introduced into the sand mixer 2. The sand mixer 2 mixes the introduced molding sand, the binder, and the hardening agent to produce mixed sand. The mixed sand including the molding sand, the binder, and the hardening agent becomes a material of the self-hardening mold that is cured as time elapses.

The mixed sand produced by the sand mixer 2 is conveyed to a molding field where a mold 12 is molded. The mold 12 has a molding flask 14. For example, the mixed sand produced by the sand mixer 2 is discharged from the discharge port of the sand mixer 2 and is filled into the molding flask 14 further mounted on a pattern 18 mounted on the molding board 16. The mixed sand filled in the molding flask 14 is compacted by an operator in a molding field to manufacture the mold 12. The mold 12 manufactured in the molding field is, for example, a cope or a drag. When the mixed sand includes the molding sand, the binder, and the hardening agent, the mold 12 becomes a self-hardening mold that cures over time.

Figure 3:
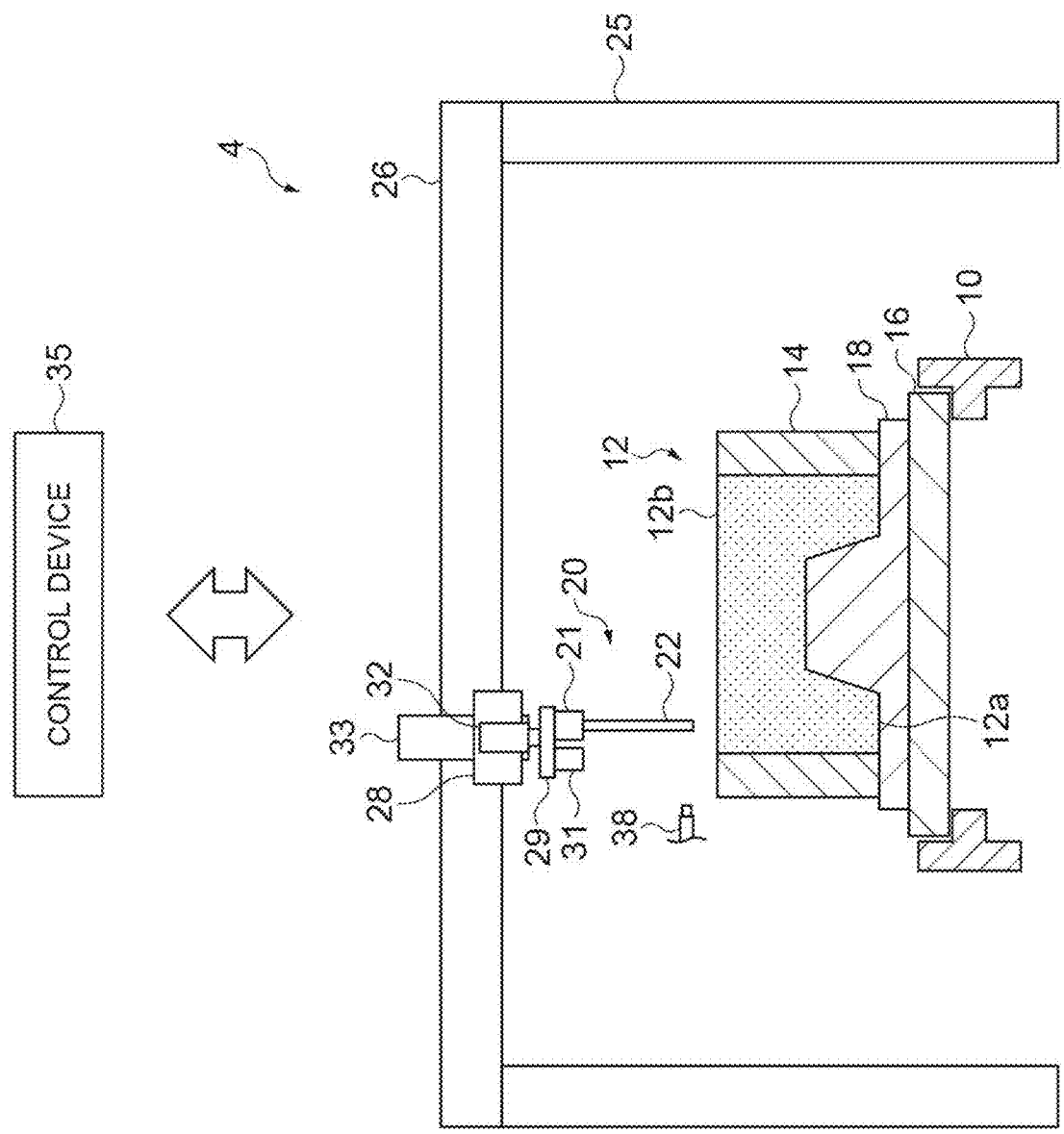
FIG. 3 is a side view schematically illustrating the strength measuring device.

FIG. 3 is a cross-sectional view showing an example of the molded mold 12. As shown in FIG. 3, the mold 12 is formed on the pattern 18 having a shape corresponding to the shape of the product to be cast. The mold 12 has a product surface 12a in contact with the pattern 18 and a back surface 12b on the opposite side of the product surface 12a. The formed mold 12 is conveyed by the conveying line 10 towards the strength measuring device 4.

The conveying line 10 conveys the mold 12 along the conveying direction (The X direction). The conveying line 10 conveys the mold 12 towards the pouring device 7 arranged downstream of the molding system 1. As the conveying line 10, various conveying devices such as a belt conveyor, a chain conveyor, or a roller conveyor can be used. For example, when the conveying line 10 is a roller conveyor having a driving roller, the molding board 16 is formed with a roller running surface that runs on the driving roller.

The conveying line 10 may extend, for example, linearly between the molding field for the mold 12 and the pouring device 7, or may extend stepwise. The conveying line 10 may convey the mold 12 along a curved conveying path. The conveying line 10 sequentially conveys, for example, a plurality of molds 12 arranged at equal intervals in the conveying direction from the molding field toward the pouring device 7. The conveying line 10 may be intermittently driven, for example, to convey the mold 12 by a predetermined frame. The predetermined frame may be one frame or a plurality of frames.

The strength measuring device 4 is provided on the conveying line 10, and measures information about the strength of the mold 12 (hereinafter referred to as "strength information"). The strength information of the mold 12 refers to, for example, a reaction force measured by a measurement probe 23 described later or a compressive strength of the mold 12. Details of the strength measuring device 4 will be described later. The mold 12 whose strength information has been measured by the strength measuring device 4 is conveyed toward the drawing device 5 by the conveying line 10.

The drawing device 5 is arranged downstream of the strength measuring device 4. The drawing device 5 is a device to draw the mold 12 from the pattern 18 (see FIG. 3). Drawing the mold 12 refers to removing the mold 12 from the pattern 18. By removing the mold 12 from the pattern 18 by the drawing device 5, the product surface 12a in which the surface shape of the pattern 18 is copied to the mold 12 is formed. The product surface 12a defines a cavity which is a space corresponding to the product shape. The drawing device 5 may remove the molding flask 14 from the pattern 18 in addition to the mold 12. The mold 12 drawn from the pattern 18 by the drawing device 5 is conveyed toward the mold assembling device 6 by the conveying line 10.

The mold assembling device 6 is arranged downstream of the drawing device 5. The mold assembling device 6 is a device for assembling the mold 12 serving as a cope and the mold 12 serving as a drag among the plurality of molds 12 conveyed by the conveying line 10. The mold assembling device 6 may set the core between the cope and the drag. The mold assembling device 6 may automatically assemble the cope and the drag transported on the conveying line 10, or the operator may operate the mold assembling device 6 to perform the mold assembling of the cope and the drag. The mold 12 in which the cope and the drag are assembled by the mold assembling device 6 is conveyed toward the pouring device 7 by the conveying line 10.

The pouring device 7 is arranged downstream of the mold assembling device 6. The pouring device 7 produces a cast product having a shape corresponding to the shape of the cavity of the mold 12 by pouring molten metal into the mold 12. The operation of the pouring device 7 is controlled by a line control unit 8, for example. In one embodiment, the pouring device 7 pours the molten metal into the mold 12 under conditions (pouring amount, pouring speed, and the like) corresponding to a control signal from the line control unit 8. The mold 12 into which the molten metal is poured is conveyed to an area where a post-process is performed by a conveying line 10, and the cast product is taken out from the mold 12.

The line control unit 8 is a computer such as a programmable logic controller (PLC) including a processor, a storage device, an input device, a display device, a communication device, and the like, and controls the operation of the entire molding system 1. The line control unit 8 implements various functions described later by loading a program stored in the storage device and executing the loaded program by the processor, for example. In the line control unit 8, an operator can perform an input operation of a command or the like in order to manage the molding system 1 by using the input device, and an operation state of the molding system 1 can be visualized and displayed by the display device.

The line control unit 8 is communicably connected to the sand mixer 2, the sand supply device 2a, the binder supply device 2b, the hardening agent supply device 2c, the strength measuring device 4, the drawing device 5, the mold assembling device 6, and the conveying line 10. The line control unit 8 sends control signals to the sand mixer 2, the sand supply device 2a, the binder supply device 2b, the hardening agent supply device 2c, the strength measuring device 4, the drawing device 5, the mold assembling device 6, and the conveying line 10 to control operations of these devices.

For example, the line control unit 8 receives the strength information of the mold 12 measured by the strength measuring device 4 and controls the conveying line 10 to convey the mold 12 to the drawing device 5 when the strength information of the mold 12 is equal to or greater than a predetermined threshold value. Then, the drawing device 5 is controlled to draw the mold 12 from the pattern 18. On the other hand, when the strength information of the mold 12 is less than the predetermined threshold value, the line control unit 8 causes the mold 12 to wait on the conveying line 10 for a predetermined time. In addition, the line control unit 8 may control the amounts of the molding sand, the binder, and the hardening agent supplied to the sand mixer 2 from the sand supply device 2a, the binder supply device 2b, and the hardening agent supply device 2c according to the strength information of the mold 12 measured by the strength measuring device 4.

The molding system 1 of one embodiment may further include a positioning unit 41. The positioning unit 41 positions the mold 12 so that the mold 12 on the conveying line 10 is located at the measurement position. The measurement position is a position where the strength information of the mold 12 is measured by the strength measuring device 4, and is set, for example, below the strength measuring device 4. The positioning unit 41 has a sensor for detecting the approach of the mold 12. For example, as shown in FIG. 2, the positioning unit 41 may include two proximity switches. The two proximity switches are arranged along the conveying direction (X direction) of the conveying line 10. In the example illustrated in FIG. 2, the positioning unit 41 includes a proximity switch 41a disposed on the upstream side in the conveying direction and a proximity switch 41b disposed on the downstream side in the conveying direction.

The proximity switch 41a and the proximity switch 41b send a detection signal to the line control unit 8 to stop the conveying line 10 when detecting the approach of the mold 12 conveyed on the conveying line 10. To be more specific, when the line control unit 8 receives the signal for detecting the approach of the molding board 16 from the proximity switch 41a, the line control unit 8 controls the conveying line 10 to reduce the conveying speed of the mold 12. Thereafter, when the line control unit 8 receives the signal for detecting the approach of the molding board 16 from the proximity switch 41b, it controls the conveying line 10 to stop the conveyance of the mold 12. As described above, by reducing the conveying speed of the mold 12 when the mold 12 approaches the measurement position and then stopping the transport of the mold 12 when the mold 12 reaches the measurement position, the mold 12 can be accurately stopped at the measurement position.

The size of the mold 12 conveyed on the conveying line 10 may be different depending on the size of the cast product to be produced. In the example of FIG. 2, a plurality of molds 12 having different sizes are conveyed on the conveying line 10. The size of the molding board 16 is designed to be large enough to mount the largest mold 12. The mold 12 may be mounted approximately in the center of the molding board 16.

The strength measuring device 4 will now be described in detail with reference to FIGS. 2 and 3. FIG. 2 is a top view schematically illustrating the strength measuring device according to an embodiment. FIG. 3 is a side view schematically illustrating the strength measuring device according to an embodiment. As shown in FIG. 2, the strength measuring device 4 is disposed above the conveying line 10 and measures the strength information of the mold 12 conveyed by the conveying line 10. In the example shown in FIG. 2, an elongated beam member 26 extending in the Y direction so as to cross the conveying line 10 is provided above the conveying line 10, and the beam member 26 is supported by a frame 25 disposed outside the conveying line 10. The strength measuring device 4 is attached to the beam member 26 above the conveying line 10.

The strength measuring device 4 measures the strength information of the mold 12 placed at the measurement position. As shown in FIG. 3, the strength measuring device 4 includes a measurement unit 20, a distance sensor 31, a lifting device 32, a slider 33, and a control device 35.

Figure 4:
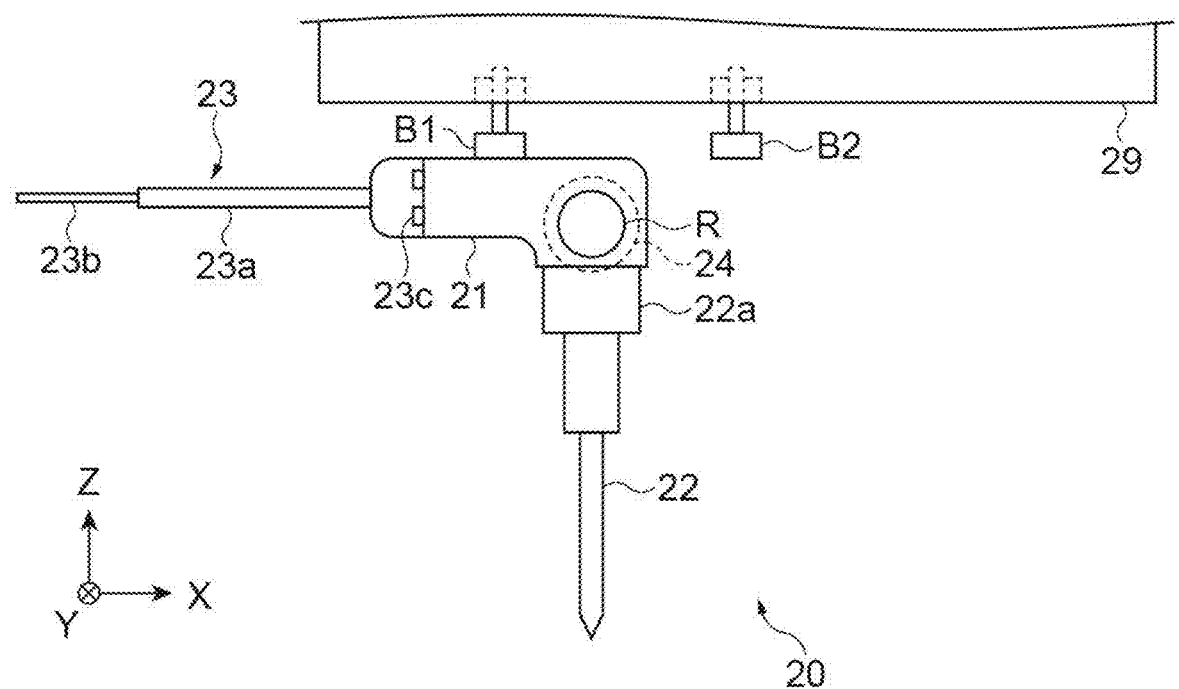
FIG. 4 is a side view schematically illustrating the measurement unit.

FIG. 4 is a side view of the measurement unit 20 viewed from the Y direction. As shown in FIG. 4, the measurement unit 20 includes a main body portion 21, a cutting tool 22, and a measurement probe 23. The main body portion 21 is formed in a substantially L shape and holds the cutting tool 22 and the measurement probe 23. The main body portion 21 is provided with a rotating shaft R extending in the Y direction. The rotating shaft R is, for example, a rotating shaft of a rotary actuator 24. The main body portion 21 is rotated about the rotating shaft R by the driving force of the rotary actuator 24.

The cutting tool 22 is an elongated tool for forming a hole in the mold 12, such as a drill, an end mill, and a hole saw. As will be described later, the cutting tool 22 forms a bottomed hole extending from the back surface 12b toward the product surface 12a in the mold 12. As shown in FIG. 4, the cutting tool 22 extends in a radial direction (a direction perpendicular to the extending direction of the rotating shaft R) with respect to the axial direction of the rotating shaft R. A cutting edge for forming a hole in the mold 12 is formed at the distal end of the cutting tool 22. Immediately before a hole is formed in the mold 12, the tip of the cutting tool 22 is directed downward. A base end of the cutting tool 22 is connected to a drive source 22a such as an electric motor disposed inside the main body portion 21. The cutting tool 22 is rotated about an axis of the cutting tool 22 by driving of the drive source 22a.

The measurement probe 23 can be inserted into the hole formed by the cutting tool 22 and measures a reaction force received from a bottom of the hole. As shown in FIG. 4, the measurement probe 23 has an elongated shape and extends in a radial direction with respect to the axial direction of the rotating shaft R. The measurement probe 23 includes a base portion 23a and a tip portion 23b. A sensor unit 23c that measures the reaction force (load) received by the measurement probe 23 is provided on the base end side of the base portion 23a. The sensor unit 23c includes, for example, a load cell or a force sensor. The tip portion 23b is detachably connected to the distal end of the base portion 23a. The tip portion 23b may have a smaller radius than the base portion 23a.

As described above, the cutting tool 22 and the measurement probe 23 integrally rotate around the rotating shaft R in accordance with the rotation of the rotating shaft R. In one embodiment, the cutting tool 22 and the measurement probe 23 may form an angle (predetermined angle) of 90° in the circumferential direction around the rotating shaft R. In this case, when the rotating shaft R is at a first rotation angle, the extending direction of the cutting tool 22 becomes perpendicular to the back surface 12b of the mold 12 disposed at the measurement position, and the tip of the cutting tool 22 is directed downward. At this time, the extending direction of the measurement probe 23 is horizontal to the back surface 12b of the mold 12. On the other hand, when the rotation angle of the rotating shaft R is a second rotation angle shifted by 90° from the first rotation angle, the extending direction of the measurement probe 23 becomes perpendicular to the back surface 12b of the mold 12 disposed at the measurement position, and the tip of the measurement probe 23 is directed downward. At this time, the extending direction of the cutting tool 22 is horizontal to the back surface 12b of the mold 12.

The measurement unit 20 is fixed to the bracket 29. As shown in FIG. 4, bolt B1 and B2 for positioning may be provided between the measurement unit 20 and bracket 29. The bolts B1 and B2 are spaced apart from each other in the X direction, and are configured such that a protrusion amount from the surfaces of the brackets 29 can be individually adjusted. For example, the bolt B1 is configured such that the head of the bolt B1 comes into contact with the main body portion 21 of the measurement unit 20 when the rotating shaft R is at the first rotation angle, and restricts further rotation of the rotating shaft R. On the other hand, the bolt B2 is configured such that the head of the bolt B2 comes into contact with the main body portion 21 of the measurement unit 20 when the rotating shaft R is at the second rotation angle, and restricts further rotation of the rotating shaft R. By adjusting a protrusion amount of bolt B1 and bolt B2 with respect to the surfaces of bracket 29, the tip of cutting tool 22 when rotating shaft R is at the first rotation angle and the tip of measurement probe 23 when rotating shaft R is at the second rotation angle are disposed at the same position. Since the measurement unit 20 is positioned as described above, the measurement probe 23 may be quickly inserted into the hole formed in the mold 12 by the cutting tool 22.

The distance sensor 31 is fixed to the bracket 29 together with the measurement unit 20. As the distance sensor 31, for example, a laser sensor, an ultrasonic sensor, or a contact sensor is used. The distance sensor 31 is disposed above the conveying line 10 and measures the distance between the distance sensor 31 and the mold 12 disposed on the conveying line 10. When the mold 12 is not present on the conveying line 10, the distance sensor 31 outputs a signal indicating the distance from the distance sensor 31 to the upper surface of the molding board 16 or the pattern 18.

The lifting device 32 is provided between the bracket 28 and the bracket 29. The lifting device 32 is, for example, an actuator that moves the bracket 29 in the vertical direction (Z direction). As the lifting device 32, for example, a hydraulic cylinder, an air cylinder, an electric cylinder, or the like is used. When the bracket 29 is moved in the up-down direction by driving the lifting device 32, the measurement unit 20 and the distance sensor 31 fixed to the bracket 29 are integrally moved in a direction in which the measurement unit 20 and the distance sensor 31 is close to and away from the mold 12 (Z direction).

The bracket 28 is fixed to the slider 33. The slider 33 is provided on the beam member 26, and is coupled to a drive mechanism including, for example, a ball screw, a linear guide, and a servo motor. The slider 33 moves the bracket 28, the lifting device 32, and the bracket 29 along the extending direction (Y direction) of the beam member 26 by driving the driving mechanism. Along with the movement of the slider 33, the measurement unit 20 fixed to the bracket 29 moves in the Y direction. That is, the slider 33 functions as a moving unit that integrally moves the cutting tool 22 and the measurement probe 23 in the horizontal direction perpendicular to the conveying direction of the mold 12.

The control device 35 is a computer such as a programmable logic controller (PLC) including a processor, a storage device, an input device, a display device, a communication device, and the like, and controls the entire operation of the strength measuring device 4. For example, the control device 35 loads a program stored in the storage device and executes the loaded program by the processor, thereby implementing various functions described below. In the control device 35, an operator can perform an input operation of a command or the like in order to manage the molding system 1 by using the input device, and an operation state of the molding system 1 can be visualized and displayed by the display device.

The control device 35 is communicably connected to the measurement unit 20, the lifting device 32, the slider 33, and the line control unit 8. For example, the control device 35 sends control signals to the measurement unit 20, the lifting device 32, and the slider 33 to control the rotation angle of the rotating shaft R, the operation of the drive source 22a, the position of the measurement unit 20 in the Z direction, and the position of the slider 33 in the Y direction. More specifically, the control device 35 controls the rotation angle of the rotating shaft R and the position of the measurement unit 20, to form a hole in the mold 12 using the cutting tool 22, and measure the strength information inside the mold 12 using the measurement probe 23.

In addition, the control device 35 may store the strength information of the mold 12 and mold information related to the mold 12 in association with each other. As the mold information, for example, a manufacturing number of the mold 12, dimensional information of the mold 12, a molding time, molding conditions, and the like are exemplified. The molding conditions include, for example, the addition amounts of the binder and the hardening agent contained in the mixed sand, the types of the molding sand, the binder and the hardening agent, the sand metal ratio, the air temperature, the humidity, the sand temperature before mixing, and the molding time.

The control device 35 may store the strength information and the mold information in a radio frequency identifier (RFID) tag attached to the molding flask 14, the molding board 16, or the pattern 18. In addition, a bar code, a number, or a character string capable of reading the mold information may be attached to or stamped on the mold 12. A bar code or the like capable of reading the mold information may be attached to or marked on the molding flask 14, the molding board 16, or the pattern 18.

In one embodiment, the strength measuring device 4 may further include a foreign matter removal device 38 to remove foreign matter attached to the cutting tool 22 and the measurement probe 23. The foreign matter removal device 38 is, for example, a blower that ejects air toward the measurement probe 23 to remove molding sand or the like attached to the measurement probe 23. The foreign matter removal device 38 may be a brush to clean the measurement probe 23, a suction device to suck foreign matter from the measurement probe 23, or a vibration device to apply vibration to the measurement probe 23.

Figure 5:
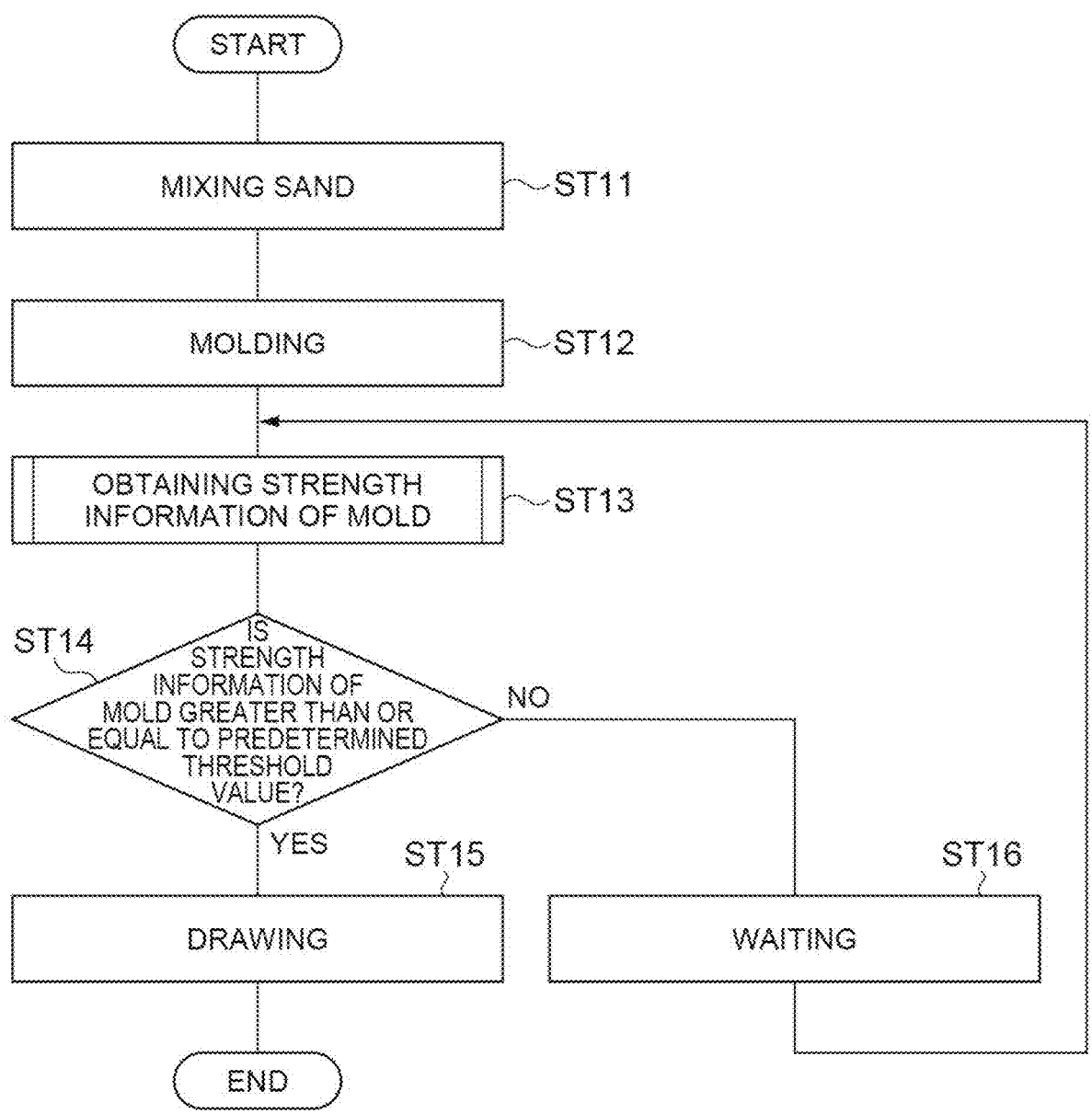
FIG. 5 is a flowchart illustrating a molding method according to one embodiment.

Next, with reference to FIG. 5, a molding method using the molding system 1 will be described. FIG. 5 is a flowchart illustrating a molding method according to an embodiment. Each step in the flowchart shown in FIG. 5 is executed by, for example, the line control unit 8 controlling each functional element of the molding system 1.

In the molding method according to an embodiment, first, the molding sand, the binder, and the hardening agent are supplied to the sand mixer 2 from the sand supply device 2a, the binder supply device 2b, and the hardening agent supply device 2c, respectively. The sand mixer 2 mixes the introduced molding sand, binder, and hardening agent to produce mixed sand (step ST11). Next, the operator compacts the mixed sand to mold (form) the mold 12 (step ST12).

Next, the strength measuring device 4 measures the strength information of the formed mold 12 (step ST13). The strength measuring device 4 measures, for example, the reaction force of the mold 12 measured by the strength measuring device 4 or the compressive strength of the mold 12 determined based on the reaction force. Next, the line control unit 8 determines whether or not the strength information of the mold 12 measured by the strength measuring device 4 is equal to or greater than a predetermined threshold value (step ST14). When the strength information of the mold 12 is equal to or greater than the predetermined threshold value, for example, when the reaction force of the mold 12 measured by the strength measuring device 4 or the compressive strength of the mold 12 determined based on the reaction force is equal to or greater than the predetermined threshold value, the line control unit 8 controls the conveying line 10 to convey the mold 12 toward the drawing device 5, and the drawing device 5 draws the mold 12 from the pattern 18 (step ST15). On the other hand, when the strength information of the mold 12 is less than the predetermined threshold value, for example, when the reaction force of the mold 12 measured by the strength measuring device 4 or the compressive strength of the mold 12 determined based on the reaction force is less than the predetermined threshold value, the line control unit 8 causes the mold 12 to wait on the conveying line 10 for a predetermined time to proceed with curing of the mold 12 (step ST16). After a predetermined time has elapsed, the strength measuring device 4 measures the strength of the mold 12 again.

As described above, in the molding method according to one embodiment, the mold 12 is drawn from the pattern 18 when the strength inside the mold 12 is equal to or greater than the predetermined threshold value, and the mold 12 is made to wait on the conveying line when the strength of the mold is less than the predetermined threshold value. Therefore, the pattern 18 is prevented from being removed while the strength of the mold 12 is insufficient. As a result, occurrence of collapse or distortion of the mold 12 during drawing is suppressed.

In one embodiment, the line control unit 8 may control the addition amount of the hardening agent included in the mold 12 based on the strength information of the mold 12. For example, when the reaction force or compressive strength of the mold 12 initially measured by the strength measuring device 4 is less than a predetermined threshold value, the line control unit 8 may increase the addition amount of the hardening agent supplied from the hardening agent supply device 2c to the sand mixer 2. In addition, the line control unit 8 may adjust the blending ratio of a plurality of hardening agents having different hardening rates in accordance with the strength information of the mold 12 initially measured by the strength measuring device 4. As described above, the hardening rate of the mold 12 can be controlled by adjusting the addition amount or the mixing ratio of the hardening agent.

The line control unit 8 may control an addition amount of the binder included in the mold 12 based on the strength information of the mold 12. For example, the line control unit 8 may increase the addition amount of the binder supplied from the binder supply device 2b to the sand mixer 2 when the reaction force or compressive strength of the mold 12 is less than a predetermined threshold value after the lapse of a predetermined time. By increasing the addition amount of binder is possible to improve the strength of the mold 12 when a predetermined time has elapsed.

Figure 6:
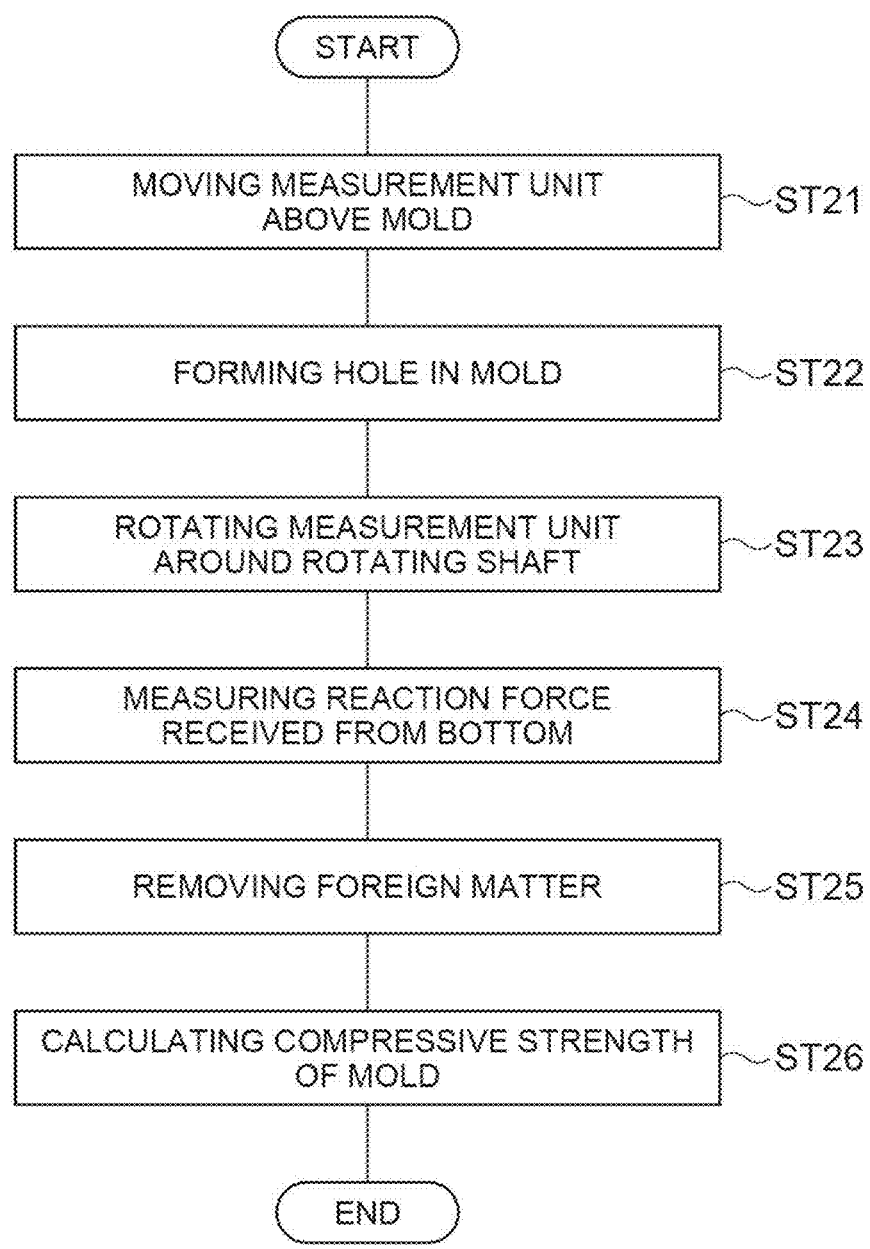
FIG. 6 is a flowchart illustrating a mold strength measuring method according to one embodiment.

Next, a mold strength measuring method using the strength measuring device 4 will be described in detail with reference to FIG. 6. FIG. 6 is a flowchart illustrating a mold strength measuring method according to an embodiment. In the mold strength measuring method illustrated in FIG. 6, the compressive strength of the mold 12 is acquired as the strength information. Each step of the flowchart shown in FIG. 6 is executed by, for example, the control device 35 controlling each functional element of the strength measuring device 4.

In the mold strength measuring method according to an embodiment, first, the control device 35 moves the measurement unit 20 above the mold 12 (step ST21). For example, the control device 35 controls the slider 33 to move the measurement unit 20 and the distance sensor 31 in the Y direction, and continuously or intermittently receives measurement data of the distance sensor 31. Then, the position at which the distance in the height direction measured by the distance sensor 31 rapidly changes is recognized as the position of the molding flask 14. The control device 35 moves the measurement unit 20 in the Y direction by a predetermined distance from the position of the molding flask 14 to dispose the measurement unit 20 above the mold 12.

Figure 7:
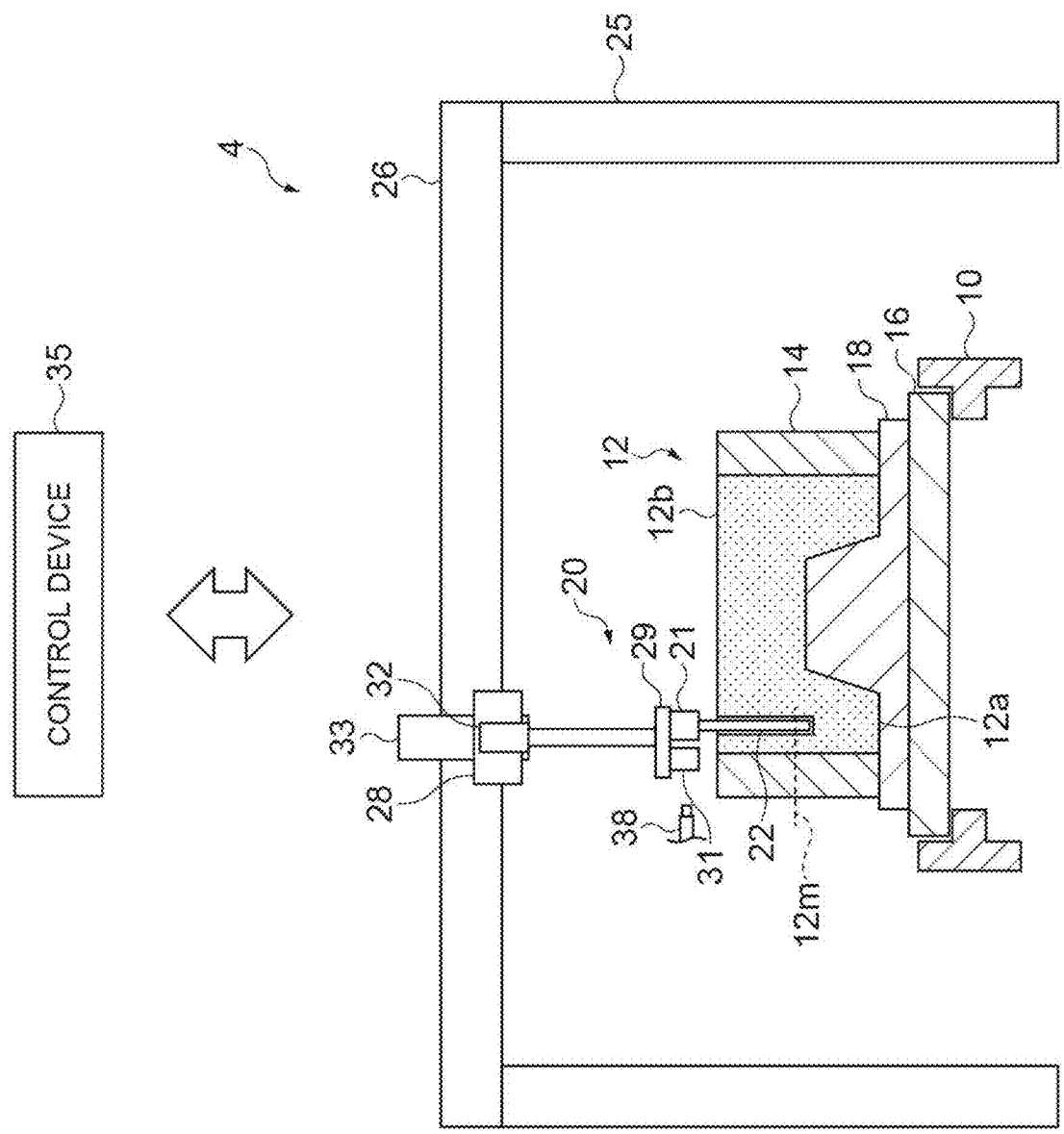
FIG. 7 is a cross-sectional view schematically illustrating one step of the mold strength measuring method according to one embodiment.

Next, the control device 35 lowers the measurement unit 20 to form a hole 30 in the mold 12 (step ST22). For example, the control device 35 controls the rotary actuator 24 of the measurement unit 20 to direct the tip of the cutting tool 22 toward the back surface 12b of the mold 12, and controls the drive source 22a to rotate the cutting tool 22 about the axis of the cutting tool 22. Next, the control device 35 controls the lifting device 32 to move the measurement unit 20 downward. Thus, as shown in FIG. 7, the cutting tool 22 pierces the mold 12 disposed on the conveying line 10 to form a bottomed hole 30 extending from the back surface 12b toward the product surface 12a in the mold 12.

At this time, a depth of the hole 30 formed in the mold 12 may be more than half of the length between the back surface 12b and the product surface 12a in the Z direction. That is, the hole 30 is formed so as to extend toward the product surface 12a beyond the middle line 12m between the back surface 12a and the product surface 12a in the Z direction. The depth of the hole 30 formed in the mold 12 may be adjusted according to the lowering amount of the cutting tool 22. In one embodiment, the control device 35 may measure a distance to the pattern 18 by a sensor when the mold 12 is formed, and determine the lowermost position of the cutting tool 22 such that the mold 12 is cut to a position before the pattern 18. Also, the control device 35 may acquire the height of the mold 12 from the RFID tag attached to the mold 12 and determine the lowermost position of the cutting tool 22 according to the height of the mold 12. The control device 35 may form the hole 30 at a position that does not interfere with the pattern 18 so that the pattern 18 is not damaged when the hole 30 is formed in the mold 12.

Figure 8:
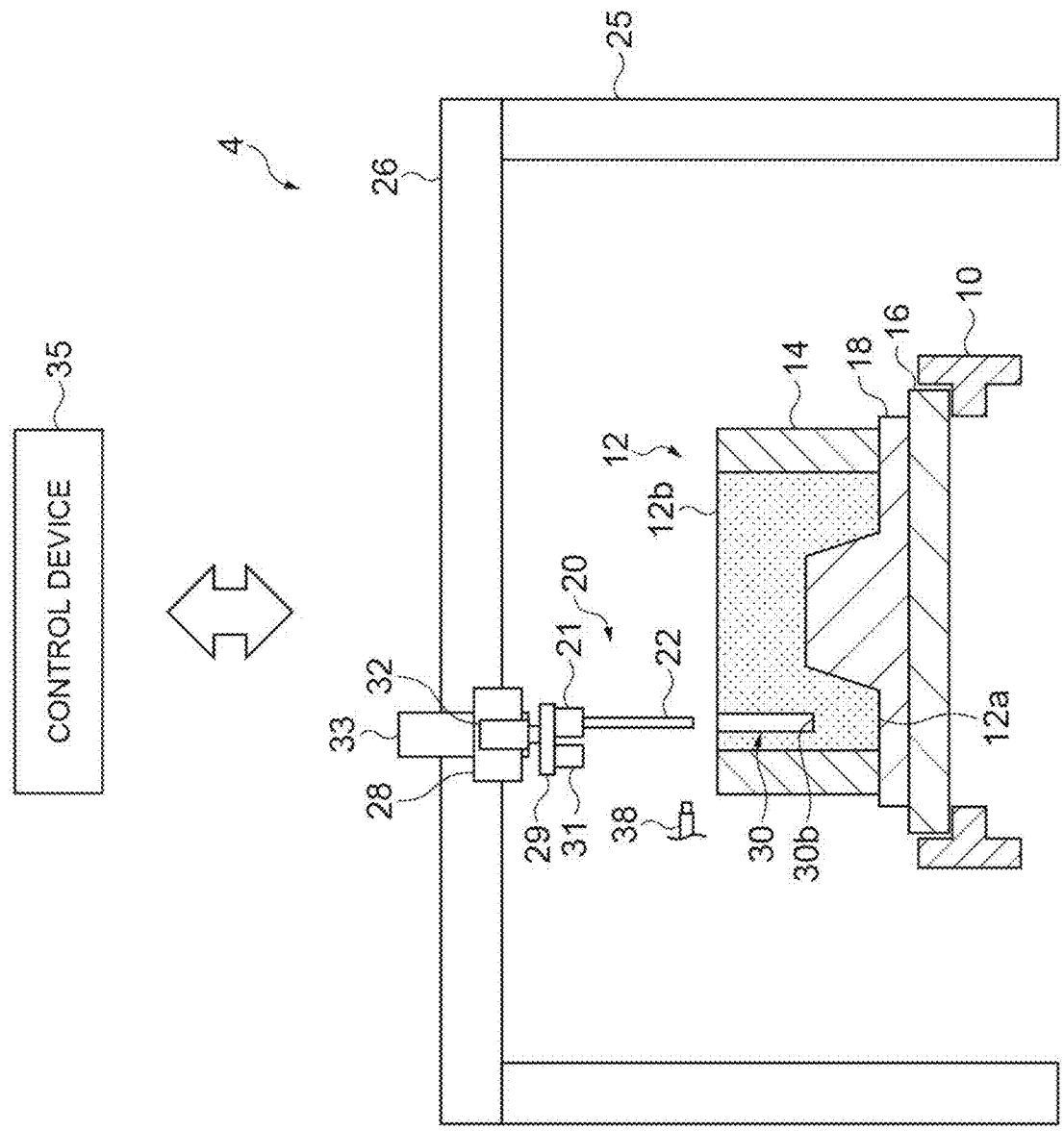
FIG. 8 is a cross-sectional view schematically illustrating one step of the mold strength measuring method according to one embodiment.
Figure 9:
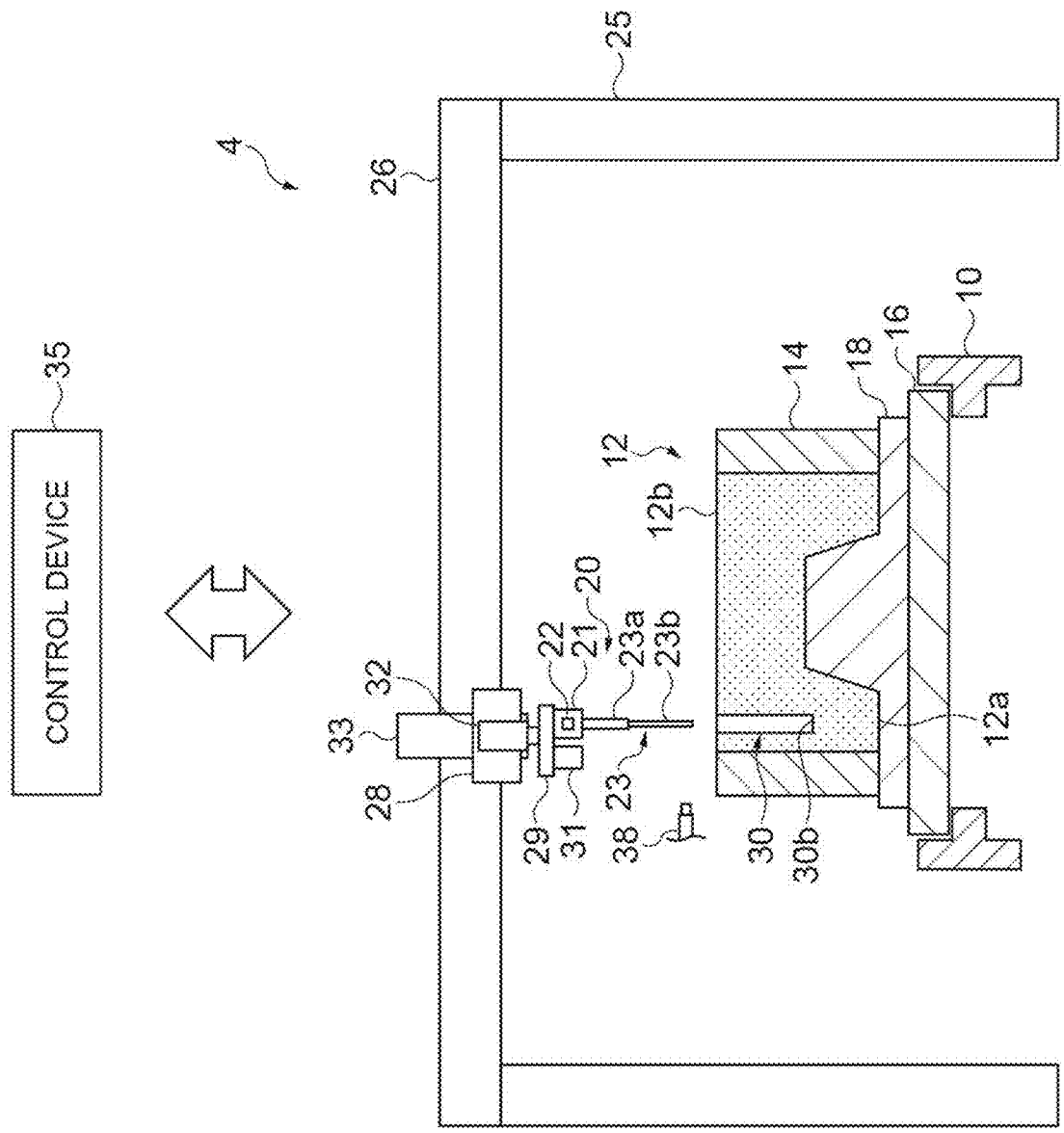
FIG. 9 is a cross-sectional view schematically illustrating one step of the mold strength measuring method according to one embodiment.
Figure 10:
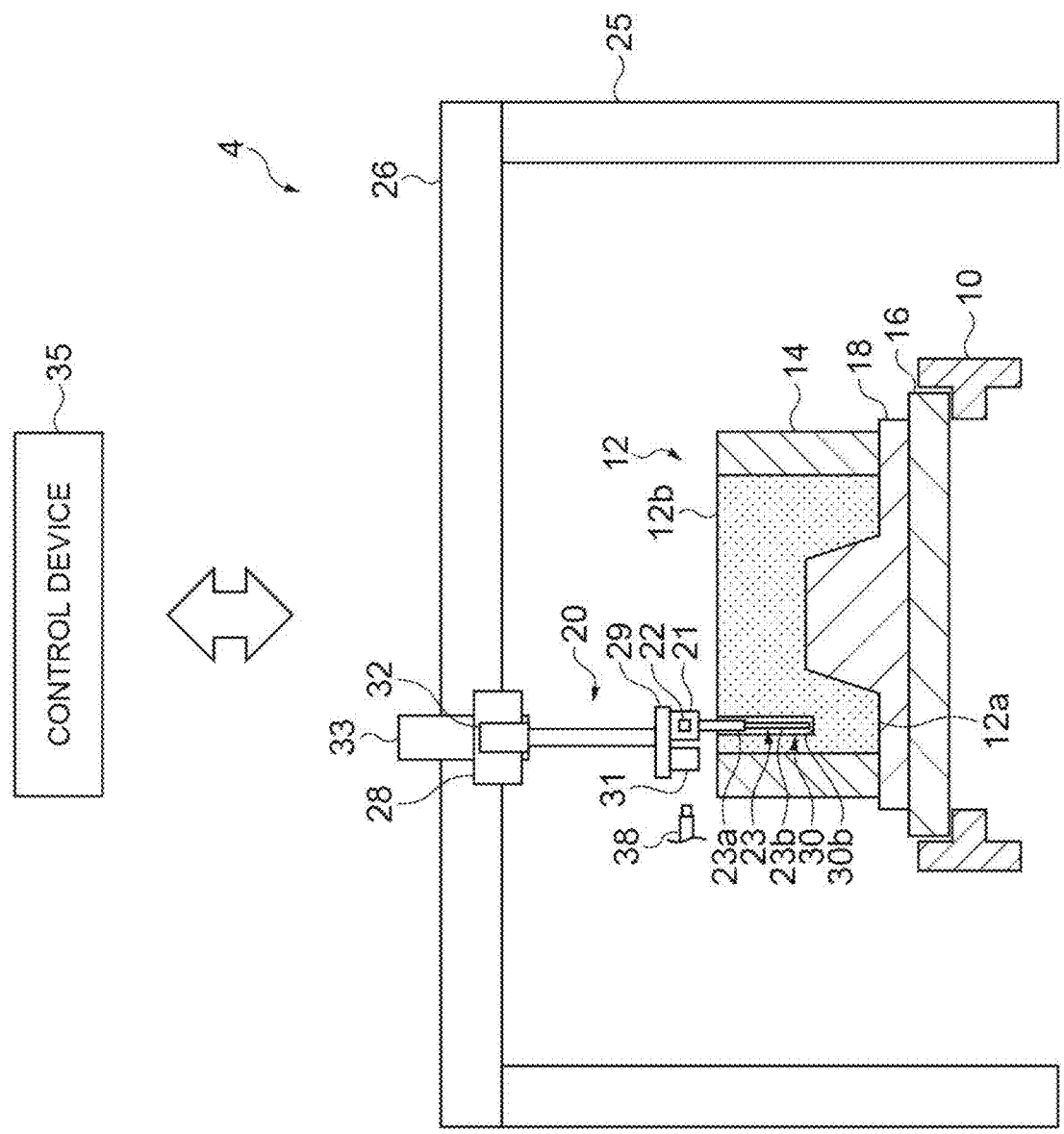
FIG. 10 is a cross-sectional view schematically illustrating one step of the mold strength measuring method according to one embodiment.
Figure 11:
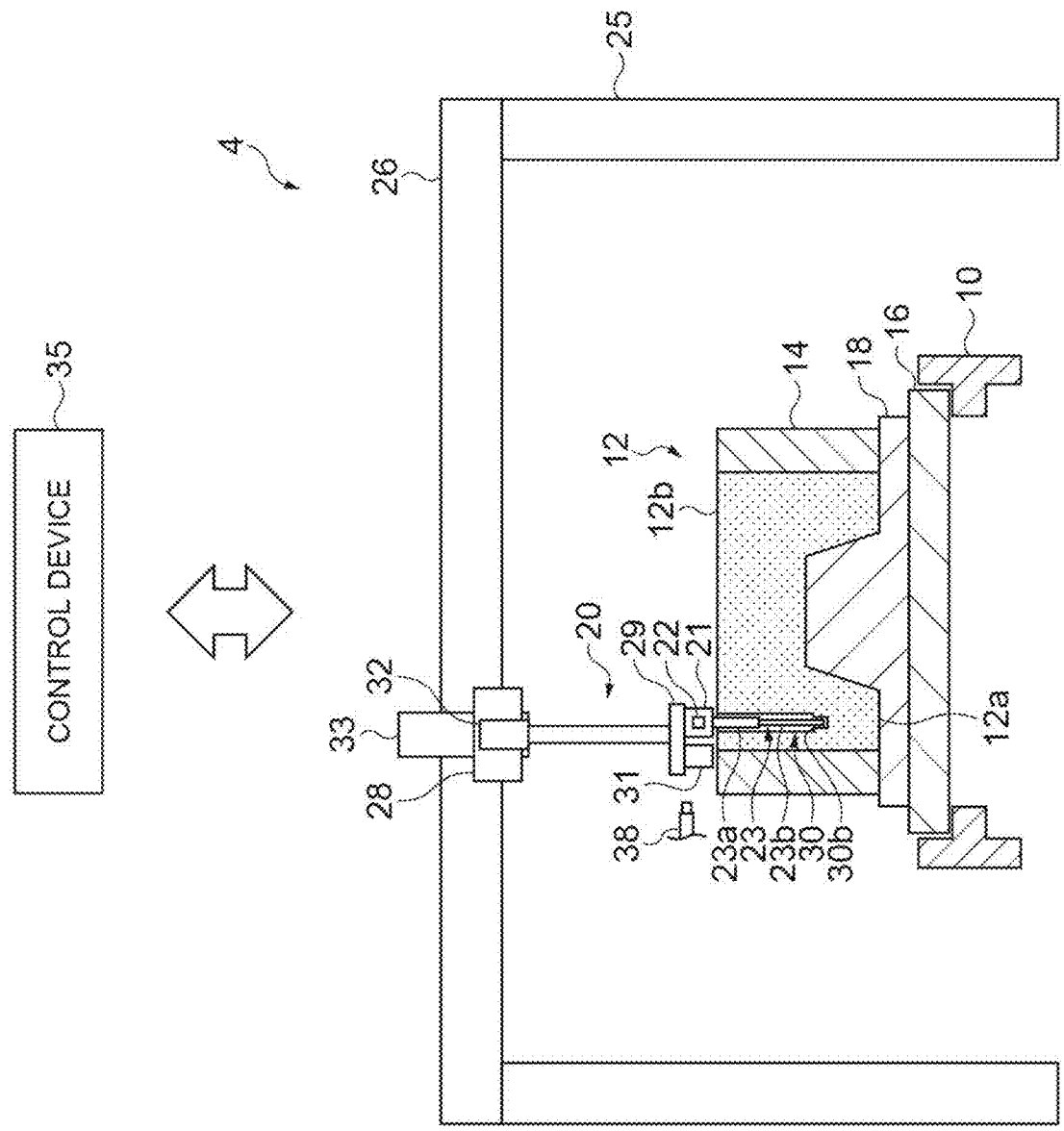
FIG. 11 is a cross-sectional view schematically illustrating one step of the mold strength measuring method according to one embodiment.

Next, as shown in FIG. 8, the control device 35 controls the lifting device 32 to move the measurement unit 20 upward. Next, as shown in FIG. 9, the control device 35 rotates the measurement unit 20 around the rotating shaft R so that the tip of the measurement probe 23 faces the mold 12 (step ST23). Next, the control device 35 controls the lifting device 32 to move the measurement unit 20 downward. As a result, as shown in FIG. 10, the measurement probe 23 is inserted into the hole 30 formed in the mold 12, and the tip of the measurement probe 23 is in contact with the bottom 30b of the hole 30. Then, as shown in FIG. 11, the control device 35 controls the lifting device 32 to further move the measurement unit 20 downward and cause the measurement probe 23 to enter the bottom 30b by a predetermined depth (for example, 50 mm). At this time, the measurement probe 23 measures the reaction force received from the bottom 30b (step ST24). The reaction force received from the bottom 30b is a measurement value related to the strength inside the mold 12 and represents the hardened state of the mold 12.

Figure 12:
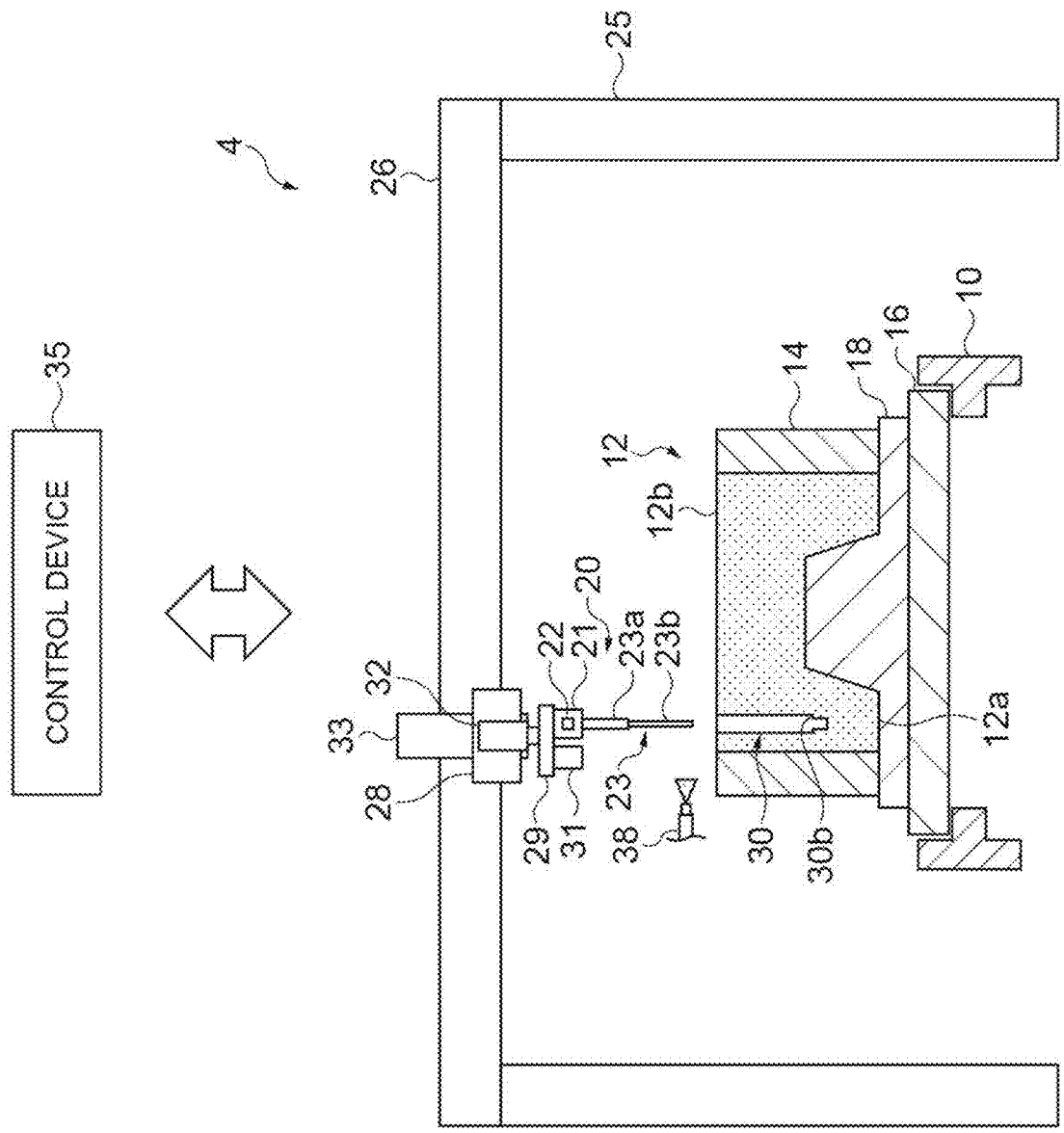
FIG. 12 is a cross-sectional view schematically illustrating one step of the mold strength measuring method according to one embodiment.

After measuring the reaction force from the bottom 30b, as shown in FIG. 12, the control device 35 raises the measurement probe 23 to pull out the measurement probe 23 from the hole 30. At this time, the foreign matter removal device 38 ejects air toward the tip of the measurement probe 23, for example, to remove foreign matter such as the molding sand attached to the measurement probe 23 (step ST25).

Next, the control device 35 calculates compressive strength from the reaction force of the mold 12 measured by the measurement probe 23 (step ST26). For example, the control device 35 stores correlation data indicating a relationship between the reaction force measured by the measurement probe 23 and the compressive strength, and converts the measured reaction force of the mold 12 into the compressive strength using the correlation data. At this time, the control device 35 may store the calculated compressive strength inside the mold 12 in association with the mold information of the mold 12. The measured reaction force is a measurement value related to the strength inside the mold 12, and represents the hardened state inside the mold 12. Therefore, the control device 35 may store the measured reaction force as the strength information inside the mold 12 without converting the reaction force of the mold 12 into the compressed strength.

As described above, the strength measuring device 4 according to the above embodiment can form the hole 30 in the mold 12 using the cutting tool 22 and insert the measurement probe 23 into the hole 30 to measure the reaction force received from the bottom 30b of the hole 30. The reaction force received from the bottom 30b of the hole 30 is a measurement value related to the strength inside the mold 12 and represents the hardened state of the mold 12. Therefore, according to the strength measuring device 4, it is possible to measure the strength information inside the mold 12 before drawing the mold. In particular, the self-hardening mold is generally formed by compacting mixed sand to form the mold 12. When the mixed sand is compacted during molding, there is generally a difference in the bulk density between the product surface 12a and the back surface 12b. Therefore, there may be variations in the strength of the mold between the product surface 12a side and the back surface 12b side, and it may be difficult to estimate the strength information of the product surface 12a from the strength information of the back surface 12b of the mold 12. On the other hand, in the strength measuring device 4, since the hole 30 extending from the back surface 12b of the mold 12 to the front of the product surface 12a is formed, it is possible to acquire the strength information of the mold 12 on the product surface 12a side which greatly affects the performance of the mold 12.

Although the molding system, the strength measuring device, and the strength measuring method according to various embodiments have been described above, various modifications can be made without limiting the scope of the invention to the above-described embodiments.

For example, the mold 12 is not limited to a self-hardening mold as long as it is a special mold. The special mold include, for example, a self-hardening mold, a thermosetting mold, or a gas-hardening mold. The thermosetting mold is manufactured by a thermosetting process such as a shell molding process or a hot box process. The gas-hardening mold is manufactured by a gas hardening process in which water glass is mixed with molding sand to form a mold, and then carbon dioxide gas is injected.

The strength measuring device 4 may not include the control device 35. In an embodiment, a function of the control device 35 may be integrated into the line control unit 8, and operations of the measurement unit 20, the distance sensor 31, the lifting device 32, and the slider 33 may be controlled by the line control unit 8.

In the mold molding method shown in FIG. 5, when the strength information of the mold 12 measured by the strength measuring device 4 is equal to or less than a predetermined threshold value, the mold 12 is made to wait on the conveying line 10, but the line control unit 8 may convey the mold 12 to a waiting station off the conveying path on the conveying line 10 and make the mold 12 wait at the waiting station for a predetermined time.

Figure 13:
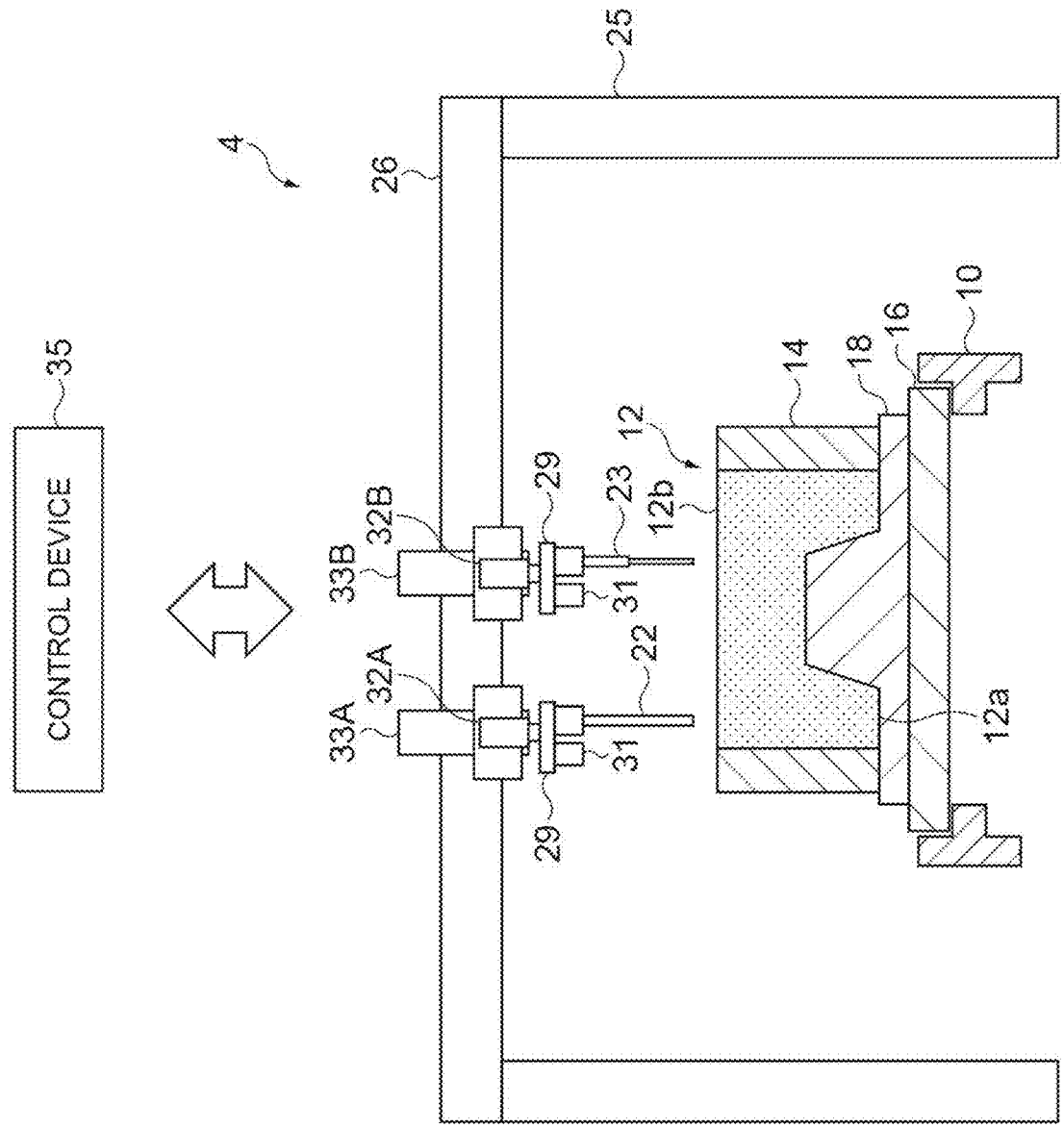
FIG. 13 is a cross-sectional view schematically illustrating one step of the mold strength measuring method according to one embodiment.

In the embodiment shown in FIG. 4, the cutting tool 22 and the measurement probe 23 are coupled to each other so as to be integrally rotatable about the rotating shaft R, but the cutting tool 22 and the measurement probe 23 may not be coupled to each other. For example, as shown in FIG. 13, the strength measuring device 4 may include a slider 33A for moving the cutting tool 22 in the Y direction and a slider 33B for moving the measurement probe 23 in the Y direction. The slider 33A moves the cutting tool 22 above the mold 12, and the lifting device 32A lowers the cutting tool 22 to form a hole in the mold 12. The slider 33B moves the measurement probe 23 above the hole formed in the mold 12, and the lifting device 32B lowers the measurement probe 23 to press the tip of the measurement probe 23 against the bottom of the hole. Then, the measurement probe 23 is inserted into the bottom of the hole so that the tip of the measurement probe 23 enters the mold 12, and the reaction force received from the mold 12 is measured. As described above, even in a configuration in which the cutting tool 22 and the measurement probe 23 are individually moved in the Y direction, it is possible to measure the strength information inside the mold 12 before drawing the mold 12.

In the strength measuring device 4 shown in FIG. 3, the distance sensor 31 is configured to move integrally with the measurement unit 20, but the distance sensor 31 may be moved separately from the measurement unit 20. For example, the distance sensor 31 may be attached to the frame 25 so as to be movable in the Z direction. In such a configuration, by measuring the distances in the Y direction between the distance sensor 31 and the mold 12 while moving the distance sensor 31 in the Z direction, it is possible to specify the position of the mold 12 in the Y direction and the position of the back surface 12b of the mold 12 in the Z direction. Therefore, it is possible to specify the position at which the hole is formed in the mold 12 based on the position of the mold 12 and the back surface 12b specified by the distance sensor 31.

Figure 14:
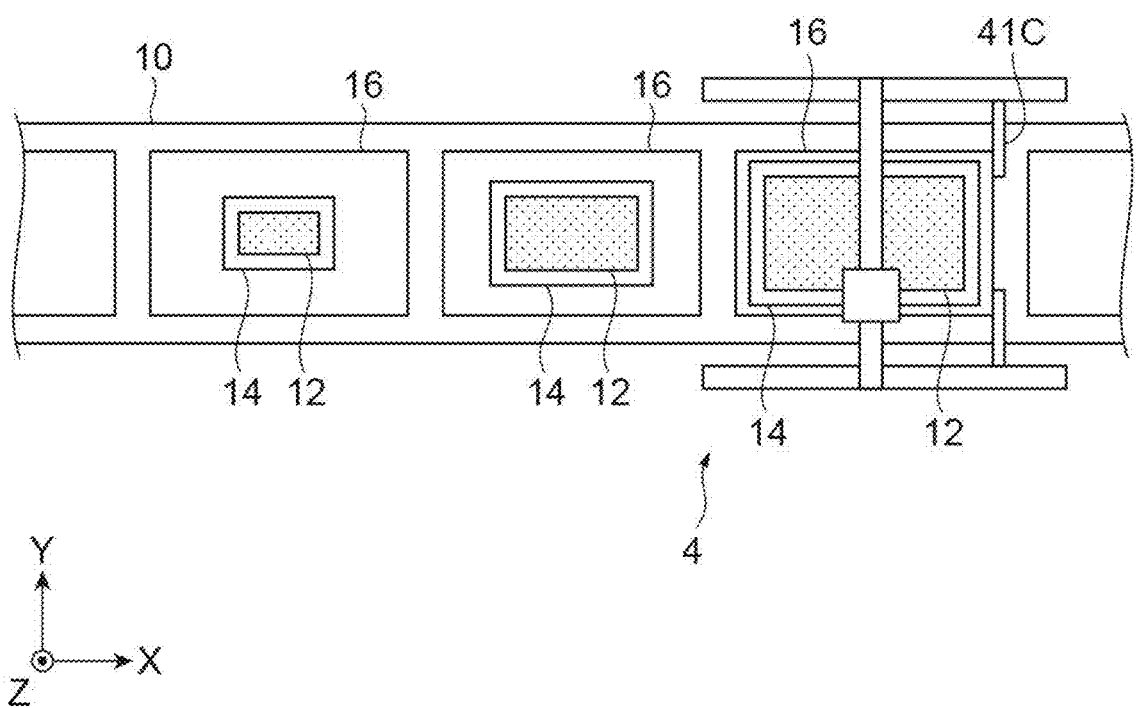
FIG. 14 is a top view schematically showing a modified example of a molding system.

In the embodiment shown in FIG. 2, the positioning unit 41 having two proximity switches positions the mold 12 at the measurement position, but the positioning unit 41 may position the mold 12 without using a proximity switch. For example, as shown in FIG. 14, the molding system may include a pair of stoppers 41C that rotate about an axis extending in the Z direction to open and close. The pair of stoppers 41C come into contact with the molding board 16 in a closed state to regulate movement in the X direction. When the measurement of the strength information of the mold 12 is completed by the measurement unit 20, the pair of stoppers 41C is turned around the axis to be in an open state, and the mold 12 is passed to the downstream side. The pair of stoppers 41C may be a pin that engages with bushes provided in the molding board 16.

In the above-described embodiment, the measurement unit 20 is moved in the Y direction and the Z direction by the slider 33 and the lifting device 32, but the measurement unit 20 may be moved by using a robot. For example, the robot is a three-axis orthogonal robot, and integrally moves the measurement unit 20 and the distance sensor 31 in the X direction, the Y direction, and the Z direction. Examples of the robot include an articulated robot, a parallel link robot, and a scalar robot. The robot is fixed to the beam member 26, for example above the conveying line 10. The robot may be a uniaxial or biaxial robot.

Although the example shown in FIG. 1 includes the conveying line 10 that conveys the mold 12 along a linear conveying path, the conveying line 10 may convey the mold 12 along an annular conveying path. It should be noted that the various embodiments described above can be combined as long as there is no contradiction.

REFERENCE NUMERALS

1: molding system, 4: strength measuring device (mold strength measuring device), 5: drawing device, 8: line control unit, 10: conveying line, 12: mold, 12a: product surface, 12b: back surface, 18: pattern, 22: cutting tool, 23: measurement probe, 23a: base portion, 23b: tip portion, 30: hole, 30b: bottom, 31: distance sensor, 32: lifting device, 38: foreign matter removal device.

What is claimed is:

1. A mold strength measuring method for obtaining information about strength of a mold having a product surface and a back surface opposite to the product surface, the method comprising:
   providing a mold strength measuring device comprising a cutting tool and a measurement probe;
   forming a bottomed hole extending from the back surface toward the product surface in the mold; and
   inserting the measurement probe into the hole to measure a reaction force received by the measurement probe from a bottom of the hole.

2. The mold strength measuring method according to claim 1, further comprising obtaining compressive strength of the bottom based on the reaction force measured by the measurement probe.

3. The mold strength measuring method according to claim 1, wherein a depth of the hole is more than half of a distance between the back surface and the product surface.

4. The mold strength measuring method according to claim 1, wherein the mold is a self-hardening mold, a thermosetting mold, or a gas-hardening mold.

* * * * *